United States Patent

Kinjo

[15] 3,649,752

[45] Mar. 14, 1972

[54] ERASING SYSTEM FOR A MAGNETIC RECORDING AND REPRODUCING APPARATUS USING A ROTARY MAGNETIC MEDIUM

[72] Inventor: Hisao Kinjo, Yokohama, Japan

[73] Assignee: Victor Company of Japan, Ltd., Yokohama, Japan

[22] Filed: Mar. 27, 1970

[21] Appl. No.: 23,137

[30] Foreign Application Priority Data

Mar. 31, 1969 Japan....................................44/23890

[52] U.S. Cl. ..................................178/6.6 DD, 179/100.2 D

[51] Int. Cl. ....................H04n 5/78, G11b 5/02, G11b 19/02

[58] Field of Search .....................178/6.6 A, 6.6 DD, 6.6 SF; 179/100.2 D

[56] References Cited

UNITED STATES PATENTS

| | | | |
|---|---|---|---|
| 3,548,095 | 12/1970 | Poulett | 178/6.6 DD |
| 3,524,012 | 8/1970 | Kihara | 178/6.6 DD |

*Primary Examiner*—Howard W. Britton
*Attorney*—Louis Bernat

[57] ABSTRACT

An erasing system for a magnetic recording and reproducing apparatus using a rotary magnetic medium in which same magnetic head is used both for erasing and recording. The erasing action is started from a point when a stepping of the magnetic head has been substantially ended in a vertical blanking interval of a video signal and continued to a point of an end of an interval in unit of one field from a start of the stepping.

9 Claims, 4 Drawing Figures

INVENTOR

HISAO KINJO

BY Louis Bernat

ATTORNEY

INVENTOR

HISAO KINJO

BY Louis Bernat

ATTORNEY

INVENTOR
HISAO KINJO
BY Louis Bernat
ATTORNEY

ERASING SYSTEM FOR A MAGNETIC RECORDING AND REPRODUCING APPARATUS USING A ROTARY MAGNETIC MEDIUM

This invention relates to an erasing system for a magnetic recording and reproducing apparatus, and more particularly to a system for erasing recorded signals with recording heads prior to recording new signals.

The invention is particularly—although not exclusively—related to a magnetic recording and reproducing apparatus using a rotary magnetic medium. Such a magnetic recording and reproducing apparatus has been disclosed in copending U.S. Pat. application No. 688,201 filed Dec. 5, 1967 by the assignee of the present invention. There, an erasing is made prior to recording, and magnetic heads make intermittent steppings for recording in one direction on the rotary magnetic medium, with a recording similarly carried out by steppings in a reverse direction, whereby video signals are endlessly recorded and reproduced. The present invention relates to the erasing system applicable in the above-mentioned system in the copending patent application.

For a conventional magnetic recording and reproducing apparatus using a rotary magnetic medium, there has been generally an apparatus for recording and reproducing video signals by either magnetic heads moving in the radial direction on a rotary magnetic disk or sheet or an apparatus for recording and reproducing video signals by magnetic heads axially moving on the surface of a rotary magnetic drum or the like. In the conventional apparatus of such type, each erasing magnetic head is usually located adjacent to and preceding each recording and reproducing magnetic head on a track of the rotary magnetic medium. Therefore, such apparatus needs to provide one erasing magnetic head for each of the recording and reproducing magnetic heads. For example, a total of four magnetic heads (including the erasing magnetic heads) have been needed for the known apparatus using two recording and reproducing magnetic heads.

Hence, the conventional magnetic recording and reproducing apparatus has a disadvantage in that the mechanism of the magnetic head portion is complicated and relatively expensive. And, the apparatus involves further disadvantages since a mistracking between the erasing magnetic head and the recording and reproducing magnetic head may often occur. Mistracking is especially likely in case the rotary magnetic medium is a pliant magnetic sheet since undesirous undulations are generated on the rotary magnetic medium by the contacting of the erasing head. Consequently the recording magnetic head following the erasing head can not contact the magnetic sheet under an optimum condition.

It is the general object of the present invention to provide a system which obviates the aforementioned disadvantages and permits erasure without need of a specific erasing magnetic head. To attain this object in the invention, the recording and reproducing magnetic head is stepped in a period of time correspond to the vertical blanking interval of a video signal. The erasing action continues during a period of time from an end of stepping to an end of the time equal to an interval of one field or frame in unit after start of its stepping.

A primary object of the present invention is, therefore, to provide a system for erasing before recording by means of a recording and reproducing magnetic head, without requiring a specific erasing magnetic head. The system includes a simple and inexpensive mechanism in the magnetic head portion for effectively erasing the recorded video signal.

Another object of the invention is to provide a system which can erase the recorded signal in such manner that an erasing scanning track and a recording scanning track may fully conform to each other without producing a mistracking therebetween.

Yet another object of the invention is to provide a system which can erase the recorded signal without causing adverse effects on the contact of the recording magnetic head with the recording medium by the erasing action.

Still other object of the invention is to provide a system which is further capable of endless recording of a video signal in full field after erasing by use of, for example, two magnetic heads.

These and other objects and features of the invention will become apparent from the following description with reference to the accompanying drawings, in which.

Figure 1:
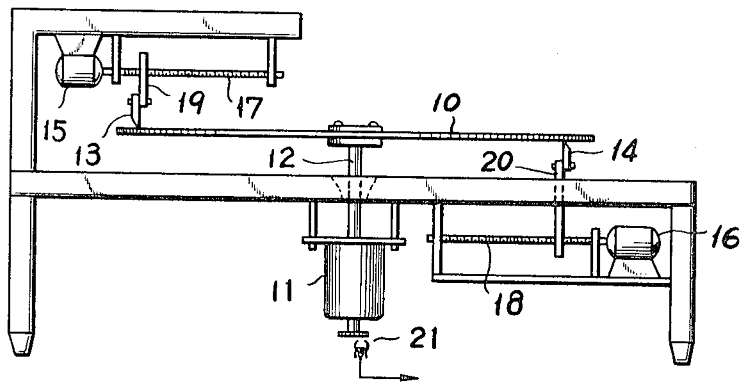
FIG. 1 is a side elevation of an embodiment of a magnetic recording and reproducing apparatus using a rotary magnetic medium in which the system of the present invention can be applied.

Referring now to FIG. 1, a magnetic recording and reproducing apparatus of a magnetic sheet type is explained in which the system of the invention can be applied. A magnetic sheet 10 has upper and lower magnetic surfaces. Sheet 10 is fixedly mounted on a rotary shaft 12 of a driving motor 11 rotating in complete synchronism and in phase with vertical synchronizing signals of a video signal. A recording and reproducing of the video signal is made by recording and reproducing magnetic heads 13 and 14 on both upper and lower surfaces of the magnetic sheet 10 while it is being rotated by the motor 11. Pulse motors 15 and 16 for driving intermittent rotations are secured to a support frame. The rotary shafts of the motors are provided with feed screws 17 and 18. The heads 13 and 14 are respectively carried by head supports 19 and 20 having half nuts respectively threaded with the feed screws 17 and 18. At the lower end, the rotary shaft 12 of the motor 11 is provided with a tone-wheel pulse generator 21.

The shaft rotational angles of the pulse motors 15 and 16, as described above, are determined by the intermittent stepping responsive to the number of input pulses that are received. In the present embodiment, the magnetic heads 13 and 14 are fed with two track pitches in case that the number of pulses applied in the motors 15 and 16 is "two," and with one track pitch in case the number of pulses is "one." The heads 13 and 14 alternately and intermittently are stepped forward and advanced from the outer to inner peripheries and reversely from the inner to outer peripheries by alternate intermittent rotations of the motors 15 and 16. Heads 13 and 14 ride over the upper and lower surfaces, respectively, of the magnetic sheet 10. During a stop of the stepping process, the magnetic heads 13 and 14 will erase the already recorded signals as later described and subsequently record new video signals.

Generally the frequency of rotation of the pulse motors is proportioned to the number of pulses of the input drive signal, and the rotation velocity is proportioned to the repetitive frequency of the drive signal pulses. A pulse motor has recently become available which has an extremely high-speed response frequency such as above 20,000 p.p.s., and it is capable of starting and stopping in a very short period of time. The pulse motor according to the present invention will make an intermittent rotation by starting and stopping in a very short period of time almost equal to a vertical blanking interval of an input video signal, that is, 0.05–0.08 P (provided that 1 P is 1/60 sec.)=0.8–1.3 m. sec. It is noted therefore that the intermittent stepping action of the magnetic head is carried out in the period of time nearly equal to the vertical blanking interval of the video signal.

Figure 2:
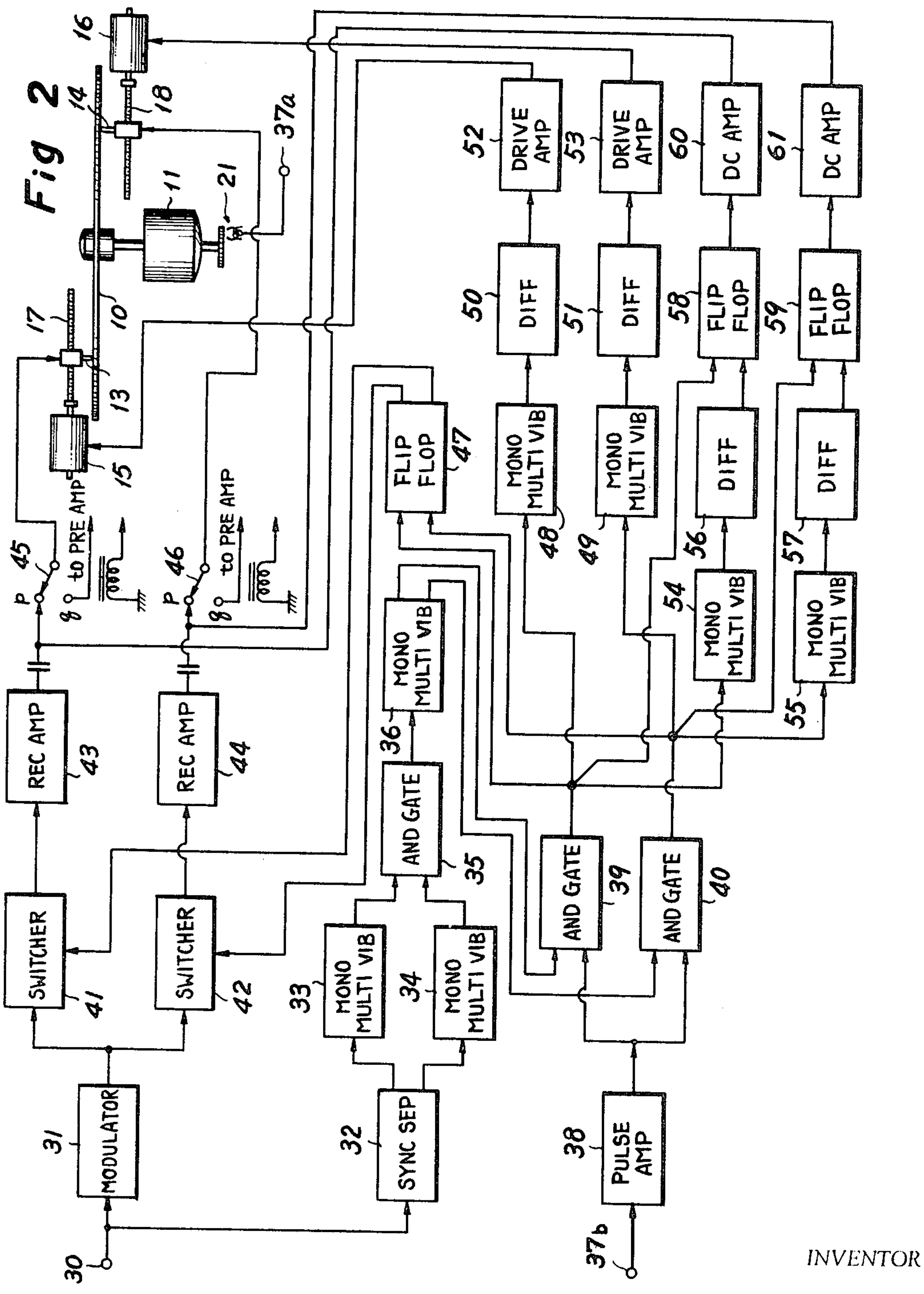
FIG. 2 is a block diagram of an embodiment of an erasing system according to the invention.

An embodiment of the erasing system according to the invention will now be illustrated with reference to the block diagram shown in FIG. 2 and to the waveforms shown in FIG. 3.

Figure 3:
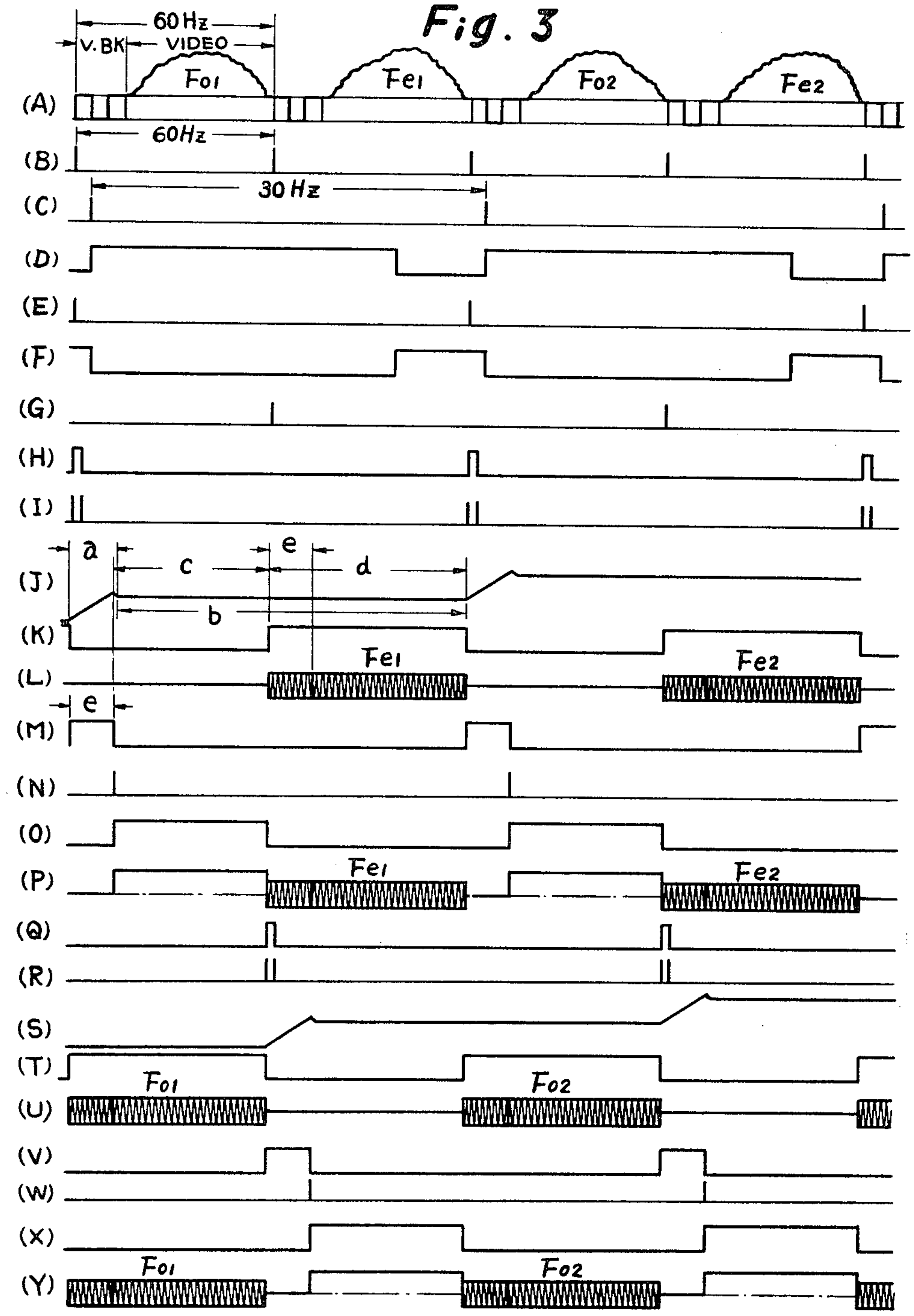
FIG. 3 shows waveforms of signals in each section of the system shown respectively in FIG. 2.

A television video signal having a waveform shown in FIG. 3 (A) applied on an input terminal 30 is and fed to a modulator 31 and a synchronizing signal separator 32. In the synchronizing signal separator 32, a synchronizing signal is separated into a vertical (V) synchronizing component and a horizontal (H)

synchronizing component. These components, respectively, drive Vorate and H-rate monostable multivibrators 33 and 34, having respectively a proper time constant for taking out frame signals. The outputs of these multivibrators are applied to an AND-gate 35 to obtain a frame pulse, as shown in FIG. 3 (C). The frame pulse is fed to a monostable multivibrator 36 having a time constant, of 20–30 m. sec., for example, it may be 25 m. sec. Thus, an output of the monostable multivibrator is as shown in FIGS. 3 (D) and 3 (F). These outputs are fed respectively to AND-gate circuits 39 and 40.

A tone wheel pulse of 60 Hz., as shown in FIG. 3 (B), is generated by the tone wheel pulse generator 21. This pulse is taken from an output terminal 37*a* and applied on an input terminal 37*b*, amplified by a pulse amplifier 38, and fed to the AND-gate circuits 39 and 40. A pulse shown in FIG. 3 (E) corresponds to the negative part of the monostable multivibrator output in FIG. 3 (D) which, in turn, depends upon the tone wheel pulses of 60 Hz. in FIG. 3 (B). The pulses of FIG. 3 (E) have a repetitive frequency of 30 Hz., generated by the AND-gate circuit 39, a pulse of 30 Hz. in FIG. 3 (G) corresponds to the negative part of the monostable multivibrator output in FIG. 3 (F) also generated responsive to the tone wheel pulses of 60 Hz. in FIG. 3 (B) and the AND-gate circuit 40.

The pulses in FIGS. 3 (E) and 3 (G) from the AND-gate circuits 39 and 40 act as trigger pulses to drive monostable multivibrators 48 and 49, which produces an output pulse form having a very short time constant such as several tenths $\mu$sec. and the square waves respectively of 50 $\mu$sec. width (namely 20 kHz. in frequency) are obtained as shown in FIGS. 3 (H) and 3 (Q). The square waves are respectively differentiated at both leading and trailing edges by subsequent differentiation circuits 50 and 51. This produces pulses having a frequency of 30 Hz., which are obtained in a two-pulse unit as shown in FIGS. 3 (I) and 3 (R). These pulses are amplified by pulse motor driving amplifiers 52 and 53 respectively and thereafter fed to the pulse motors 15 and 16 as the driving pulses.

The pulse motors 15 and 16 receive the driving pulses, as shown in FIGS. 3 (I) and 3 (R) from the amplifiers 52 and 53. Responsive thereto, these motors start and step forward in approximately 1 m. sec. and then stop. The step and stop response characteristics of the motor 15 and 16 are shown in FIG. 3 (J) and 3 (S). A period *a* at the inclined portion of the characteristic denotes the stepping period of the motor and a period *b* at the horizontal portion of the characteristic denotes the stopping period of the motor.

The outputs of the AND-gates 39 and 40 are also fed to a flip-flop circuit 47. The circuit 47 is set and reset by the outputs. From the flip-flop circuit 47, a switching signal having a waveform shown FIG. 3 (K) and a switching signal having an inverted waveform shown in FIG. 3 (T) are respectively fed to switchers 41 and 42. These switchers 41 and 42 switch a FM signal from the frequency modulator 31. Switched FM signals are taken out as shown in FIGS. 3 (L) and 3 (U). An interval of one field is equal to the positive interval of each switching signal respectively from the flip-flop circuit 47. Thus the switched FM video signals of $Fe_1$, $Fe_2$ — of even number field are obtained from the switcher 41 and the switched FM video signals of $Fo_1$, $Fo_2$ — of odd number field are obtained from the switcher 42. The FM video signals obtained by the switchings of the switchers 41 and 42 are respectively amplified by recording amplifiers 43 and 44. Thereafter, the amplified signals are respectively fed to the magnetic heads 13 and 14 via switching relays 45 and 46 connected to contacts *p*.

Monostable multivibrators 54 and 55 have a time constant of approximately 0.5–1 m. sec. For example, a 0.8 m. sec. pulse is fed from the outputs of the AND-gate circuits 39 and 40 to drive the multivibrators and produce signals of 0.8 m. sec. width in waveforms as shown in FIGS. 3 (M) and 3 (V). Differentiation circuits 56 and 57 are driven by the trailing edge portions of these signals for differentiation and generate pulses shown in FIGS. 3 (N) and 3 (W). These pulses together with the signals from the AND-gate circuits 39 and 40, are fed to flip-flop circuits 58 and 59 for setting and resetting to obtain switching pulses for preceding erasing in waveforms shown in FIGS. 3 (O) and 3 (X). Subsequently, the switching pulses are converted in impedance and amplified to currents sufficient for erasing action, such as for example 30-50 ma. These amplified currents are applied through the contacts *p* of the relays 45 and 46 to the magnetic heads 13 and 14.

Herein, after the magnetic head 13 is stepped in the interval *a* (about 1 m. sec.) as shown in FIG. 3 (J), it remains in the stopped condition for the interval *b* (about 16.6×2−1=32.2 m. sec.) The magnetic head 13 receives an erasing current for the interval *c* of about 11.6–0.8=15.8 m. sec. This interval is equal to the positive interval of the waveform shown in FIG. 3 (O). This erases the recorded signal on the magnetic sheet 10. Subsequently, the FM video signal shown in FIG. 3 (L) is applied to head 13 which records the video signal $Fe_1$ on the erased track for the interval *d* (about 16.6 m. sec) equal to one field. The erasing is not performed during the approximate stepping interval *a*; therefore, a multiple recording is effected on the unerased portion for an interval *e*. As described above, the interval *a* occurs during the vertical blanking interval of the video signal. Thus the multiple recording interval *e* will remain in the vertical blanking interval and the video information signal portion is recorded on the track upon which the preceding erasing has been completed.

Similarly, the magnetic head 13 repeats these actions of stepping, stopping, erasing and recording so as to record the video signals $Fe_2$, $Fe_3$—on the upper surface of the magnetic sheet 10. Also the magnetic head 14 will make intermittent stepping and stopping actions as shown in FIG. 3 (S). Head 14 moves alternately with the magnetic head 13 and records the video signals $Fo_1$, $Fo_2$—shown in FIG. 3 (U) on the lower surface of the magnetic sheet 10. The signal herein applied respectively on the magnetic heads 13 and 14 consists of an erasing current and a succeeding video signal for one field as shown respectively in FIGS. 3 (P) and 3 (Y).

The above-described erasing current may be a DC or an AC current. Since the stepping intervals of the pulse motors 15 and 16 are short, the erasing intervals of FIGS. 3 (O), 3 (P) and FIGS. 3 (X), 3 (Y) can be long and the multiple recording intervals can be shortened, as desired.

Figure 4:
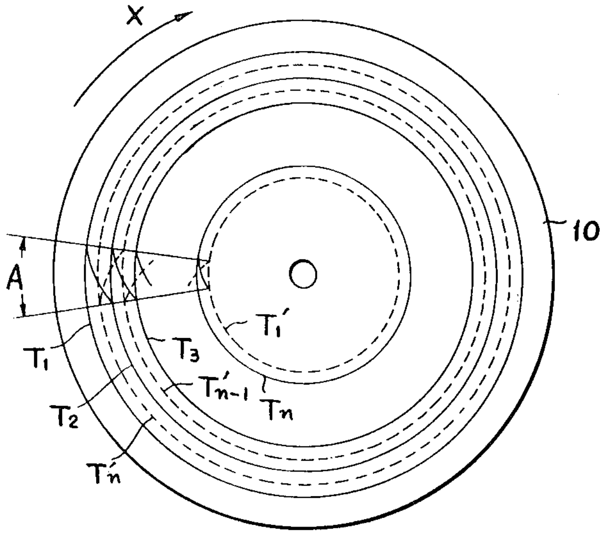
FIG. 4 is a plan view of a magnetic sheet having track patterns thereon.

FIG. 4 shows a track pattern on the magnetic sheet 10, wherein the magnetic head 13 makes intermittent stepping on the magnetic sheet 10, rotating in the direction of an arrow X. This forms concentric tracks $T_1$, $T_2$—, Tn shown in solid lines. In its forward stepping, head 13 travels from the outer to inner peripheries of the magnetic sheet, and concentric tracks $T_1'$, $T_2'$, —Tn′ shown in broken lines are made when head 13 steps back during its travel from the inner to outer peripheries. Furthermore, the magnetic head 14 also makes intermittent steps alternately with the magnetic head 13. Thus, head 14 forms on the lower surface of the magnetic sheet 10, tracks similar to each of the above-mentioned tracks.

A range shown by A on the magnetic sheet 10 in FIG. 4 denotes a track of the magnetic head 13 for the intermittent stepping interval *a* of the pulse motor 15 and magnetic head 13 shown in FIG. 3 (J). Thus the range A corresponds to approximately one vertical blanking interval. Portions of each track $T_1$, $T_2$ —$T'_1$, $T'_2$ — in the range A correspond respectively to the stepping intervals of the magnetic head 13, which will remain unerased and form the portions for multiple recording in time of recording.

So that the magnetic head 13 may travel only one track pitch when the head 13 shifts inwardly toward the innermost track $T_1'$ or outwardly toward the outermost track $T_1$, the pulse motor 15 is driven by one pulse at a time and will make stepping in rotation. Accordingly the forward track $T_1$, $T_2$— and the backward track $T_1'$, $T_2'$ — are concentrically and alternately formed in a circular shape on the magnetic sheet 10.

Slight beatings which may occur during multiple recording of a video signal for the vertical blanking interval will not possibly obstruct the vertical synchronizing signal or affect the image content and picture quality appearing on the image screen since they remain in the vertical blanking interval. In necessity, the image can be improved in form or compensated by the known process-amplifier for preventing the damage consequent on the grade of picture quality.

The driving of the pulse motors 15 and 16, the modification of waveforms of the erasing current interval, and the modification of waveforms of switched recording signals are all performed by use of the tone wheel pulse, as shown in FIGS. 3 (E) and 3 (G), respectively. The tone wheel pulses are taken out from the AND-gate circuits 39 and 40. Therefore, such driving and modifications do not produce any aberrations in phase and in time between channels. The locking of phase is completely attained by the tone wheel pulse.

The digital driving source for intermittent stepping the magnetic heads 13 and 14 may not be confined solely to the described pulse motors 15 and 16. For example, linear-type digital rotary means such as linear stepping motors, and the like, may be substituted for the pulse motors. These motors could directly effect a linear intermittent stepping movement as well as intermittent stepping rotation and rapidly rotate for the vertical blanking interval such as for example less than 1 m. sec.

It will be seen that the erasing and recording operations use the same magnetic heads as described in the above embodiment. These heads may be moved reciprocally and repetitively on the magnetic sheet 10. Movement is alternately by the magnetic heads 13 and 14 from the outer to inner peripheries and from the inner to outer peripheries on the sheet. Thus only two magnetic heads are sufficient to perform a desired so called full field endless recording.

During the reproduction of signals, the terminal 30 may receive a standard signal from outside. The standard signal and the tone wheel pulse will serve to drive the pulse motors 15 and 16 effectively. The video signals reproduced by the magnetic heads 13 and 14 are fed to reproducing preamplifiers when the relays 45 and 46 have operated to close contacts *q*.

The invention is not limited to the above-described embodiment. Various changes and modifications can be made in the system without departing from the spirit and scope of the invention.

What I claim is:

1. An erasing system for a magnetic recording and reproducing apparatus using a rotary magnetic medium comprising two magnetic heads held in contact with the rotary magnetic medium, means for rotating the magnetic medium at a predetermined velocity, means for stepping and intermittently transferring the two magnetic heads on the magnetic medium with certain stepping and stop intervals during a cycle of two fields of a video signal, means for alternately applying the video signal to the magnetic heads for alternately recording said signals in units of at least one field responsive to the stop interval of the magnetic head after it has been stepped by the stepping means, and means for applying an erasing current to each of the magnetic heads during the interval while the other head is recording and before the applying of the recording video signal to that same head during the stop interval of the magnetic heads, said stepping interval of said stepping means being substantially equal to or smaller than the vertical blanking interval of the video signal, the signals which have already been recorded on said magnetic medium being erased by the magnetic heads which have the erasing current applied thereto, and thereafter the video signal being recorded on the erased track by the same magnetic head.

2. An erasing system for a magnetic recording and reproducing apparatus using a rotary magnetic medium as defined in claim 1 wherein there are two of said magnetic heads, means whereby said stepping means drives both the magnetic heads alternately to step in a cycle comprising a unit of two fields or two frames, and each of said magnetic heads makes a stepping and an erasing for a first field or frame interval and a recording for a second field or frame interval.

3. An erasing system for a magnetic recording and reproducing apparatus using a rotary magnetic medium as defined in claim 2 wherein the magnetic heads supplied with the recording video signal make multiple recording on portions on the magnetic medium which remain unerased because the erasing current is not applied to the magnetic heads during approximately the stepping interval of the stepping means.

4. An erasing system for a magnetic recording and reproducing apparatus using a rotary magnetic medium as defined in claim 1 wherein said erasing current applying means applies the erasing current to the magnetic head during an interval extending substantially between the end of stepping of the stepping means and an end of at least one field interval extending after the start of the stepping process.

5. An erasing system for a magnetic recording and reproducing apparatus using a rotary magnetic medium as defined in claim 4 wherein the magnetic heads supplied with the recording video signal make multiple recordings on unerased portions which remain on the magnetic medium since the erasing current is not applied to the magnetic heads during approximately the stepping interval of the stepping means.

6. An erasing system for a magnetic recording and reproducing apparatus using a rotary magnetic medium as defined in claim 4 wherein the erasing current is applied to the magnetic heads during a period which starts slightly before the end of stepping by the stepping means.

7. An erasing system for a magnetic recording and reproducing apparatus using a rotary magnetic medium as defined in claim 1 further comprising means for generating a signal which is synchronized with rotation of the magnetic medium, means for taking out vertical synchronizing signals from the recording video signal, means for obtaining a switching signal jointly responsively to the rotation synchronizing signal and the vertical synchronizing signal, means responsive to the switching signal for generating a driving signal for driving the stepping means, means responsive to the switching signal for applying the erasing current to the magnetic heads for a predetermined interval, and further means responsive to the switching signal for switching the video signal and for feeding the switched video signal to the magnetic head, wherein said predetermined interval of the erasing current extends from substantially the end of stepping by the stepping means to the end of an interval, equal to the period of one field, beginning with the start of the stepping.

8. An erasing system for a magnetic recording and reproducing apparatus having a rotary magnetic medium comprising two magnetic heads in contact with the rotary magnetic medium, means for rotating the magnetic medium at a rate wherein one field of a video signal is recorded in each circular track on said medium, means for generating a first pulse series, each pulse of such video signal being synchronous in phase with each revolution of said rotary magnetic medium, first gating means for producing second and third pulse series responsive to a gating of alternate pulses from said first pulse series, said second and third pulse series being spaced apart from each other by a time interval equal to one field of the video signal, means responsive to said second and third pulse series for alternately and intermittently transferring the magnetic heads on the magnetic medium with predetermined stepping and stop intervals, means responsive to said second and third pulse series for producing two first series of square waves, the duration of each square wave being at least equal to said stepping interval and said square waves being spaced apart from each other by a time interval equal to one field of the video signal, means including first flip-flop circuits set by the trailing edges of each square wave of said two first square wave series and reset by said second and third pulse series for producing two second series of square waves which are spaced apart by a time interval equal to one field of the video signal, second gating means for gating an erasing current responsive to each pulse in said two second series of square waves respectively, means including a second flip-flop circuit set by said second pulse series and reset by said third pulse series for producing two third series of square waves which are spaced apart from each other by the time interval equal to one field of the video signal, switching means for switching the video signal responsive to each of said two third series of square waves respectively, and means for applying the output signals of said second gating means and said switching means to said two magnetic heads respectively, so that the video signal gated by said switching means follows immediately after the erasing current gated by said second gating means.

9. The erasing system as defined in claim 8 wherein said first gating means comprise synchronizing signal separator means for separating horizontal synchronizing pulses and vertical synchronizing pulses respectively from said video signal, means responsive to the horizontal and vertical synchronizing pulses for producing frame pulses, monostable multivibrator means operated responsive to the frame pulses for generating two square wave signals which have opposite polarities, and two AND gating means for gating said first pulse series responsive to each of the two square wave signals respectively and producing said second and third pulse series.

* * * * *